Jan. 26, 1926.                                                    1,570,977
C. W. WALIZER
AUTOMOBILE HEATER
Filed Feb. 17, 1925
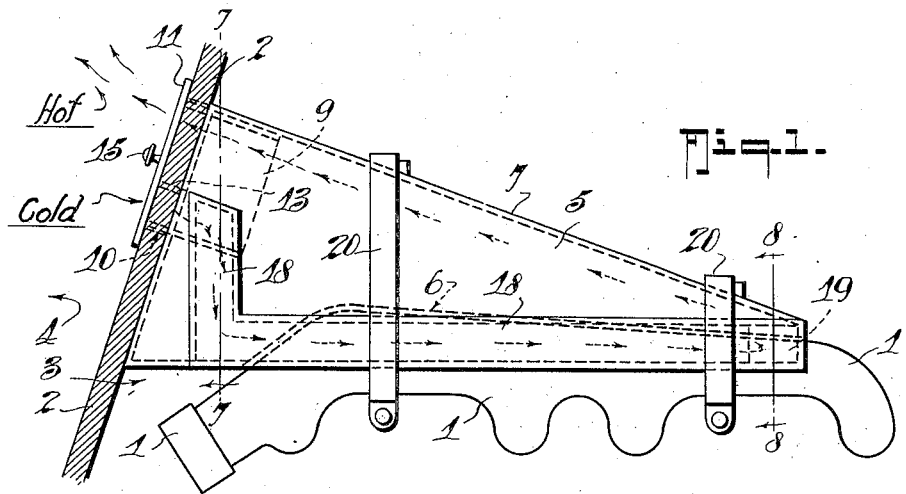
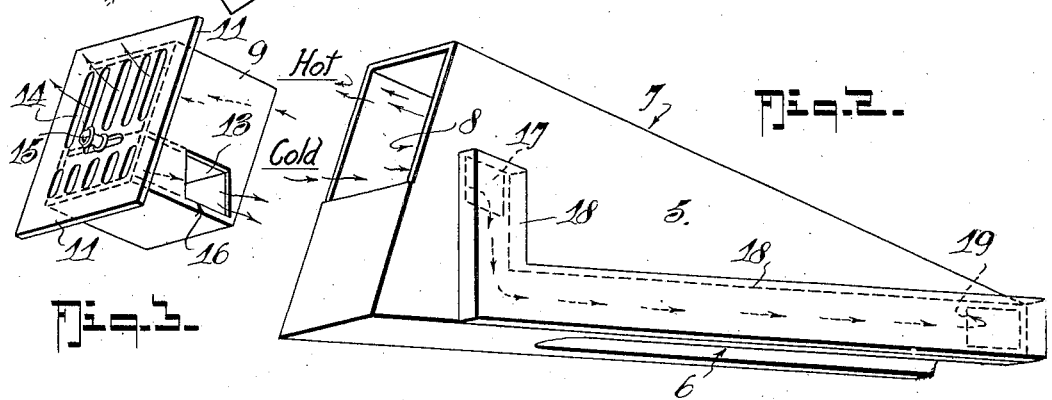
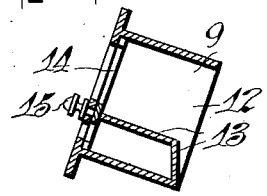
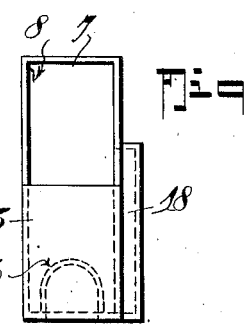
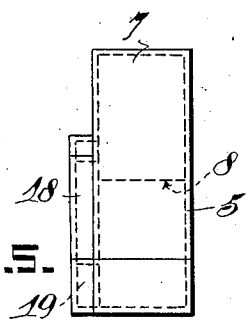
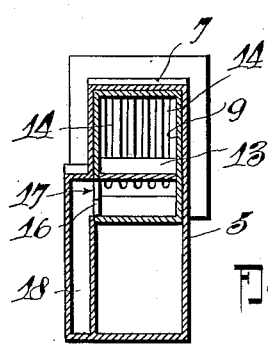
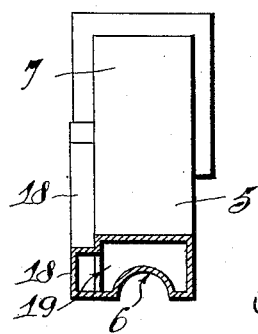
INVENTOR
C. W. Walizer.
BY
ATTORNEY Patented Jan. 26, 1926.

1,570,977

UNITED STATES PATENT OFFICE.

CLARENCE W. WALIZER, OF SALINA, KANSAS.

AUTOMOBILE HEATER.

Application filed February 17, 1925. Serial No. 9,889.

*To all whom it may concern:*

Be it known that I, CLARENCE W. WALIZER, a citizen of the United States, residing at Salina, in the county of Saline and State of Kansas, have invented certain new and useful Improvements in Automobile Heaters, of which the following is a specification.

The invention generally relates to automobile heaters and primarily has for its object to provide means whereby the heat of the exhaust gases may be utilized for heating the interior of the automobile body.

In its more detailed nature the invention seeks to provide a simple and effective means, mountable upon the exhaust manifold of an automobile engine for the purpose of utilizing the heat thereof, whereby relatively cold air may be drawn from the interior of the automobile body into close contact with the said manifold to be heated thereby and again injected into the automobile body in heated condition for the purpose specified.

With the above and other objects in view that will hereinafter appear, the invention further resides in the novel details of construction, combination and arrangement of parts, all of which will be first fully described in the following detailed description, particularly pointed out in the appended claims and illustrated in the accompanying drawing, in which:—

Figure 1 is a side elevation diagrammatically illustrating the application of the invention.

Figure 2 is a detail perspective view of the heater body.

Figure 3 is a detail perspective view of the connector pipe.

Figure 4 is a rear elevation of the heater body.

Figure 5 is a front elevation of the heater body.

Figure 6 is a detail longitudinal section of the connector pipe.

Figures 7 and 8 are detail vertical cross sections taken on the lines 7—7 and 8—8 of Figure 1, respectively.

In the drawing, in which like numerals of reference indicate like parts in all of the figures, 1 indicates the exhaust manifold of the automobile on which the invention is to be used, 2 the dash of that automobile, 3 the engine compartment thereof and 4 the interior of the body of the automobile.

The numeral 5 indicates the main body of the heater device and is hereinafter termed the heater body. The bottom of the body is curved as at 6 so that the body will partially surround the manifold upon which it is to be mounted in the manner indicated in Figures 1, 4 and 8.

The heater body is substantially rectangular in cross section and the top wall thereof is inclined downwardly from the rear thereof to the front so that the front end of the said body is relatively shallow while the rear end thereof is relatively deep.

The rear end wall of the heater body has approximately the whole upper half thereof cut away to provide a throatway 8 which is adapted to accommodate the insertion into the body 5 of a connector pipe 9 which is hollow and of rectangular shape for snugly fitting the said throatway. The connector pipe 9 may be inserted through the opening 10 provided for that purpose in the dash board 2 and the said pipe is provided with a dash abutment flange 11. It will also be observed, by reference to Figure 1, that the heater body 5 is extended rearwardly so that the rear wall thereof lies closely adjacent the dash board 2, to thus facilitate the cooperation of the connector pipe 9 therewith.

By thus inserting the open end 12 of the connector pipe into the throat 8 at the rear of the heater body 5 and dividing that pipe by the horizontally positioned plate 13, a lower cold air inlet passage into the said body and leading from the interior of the automobile body, and an upper warm air outlet out of the heater body and into the interior of the automobile body are provided.

As will be observed by reference to Figures 3 and 6 of the drawing, the connector pipe may be provided with a single shutter 14 slidable laterally through the medium of the knob 15 for regulating or closing off the passage of air into and out of the cold and warm air passages, as desired.

It will also be observed by reference to Figure 3 of the drawing that the connector pipe 9 is provided with a lateral opening 16 which is adapted to register with a similarly shaped opening 17 provided in one of the lateral walls of the heater body to connect the lower cold air passage of the said pipe 9 with the cold air duct 18 which is secured to one lateral wall of the body 5 and into which the opening 17 thereof delivers. The duct 18 is relatively narrow and extends down and runs along the lower lateral edge of the wall to which it is secured so as to be positioned closely adjacent or approximately against the exhaust manifold 1. The duct 18 extends to the front end of the heater body 5 where it communicates, through an opening 19 provided in the wall of the body 5 for that purpose, with the interior of the body in the manner clearly indicated in Figures 1, 2 and 8 of the drawing. It will be observed by reference to Figure 1 of the drawing that the heater body 5 may be securely mounted upon the exhaust manifold 1 through the medium of strap connectors 20 if it be so desired.

In operation, the relatively cold air from the interior of the automobile body will pass into the lower cold air passageway provided in the bottom of the connector pipe 9, through the lateral openings 16 and 17 into the duct 18, through the duct 18 where, by reason of its close relation with the exhaust manifold, it will be heated, and will pass into the heater body 5 through the lateral opening 19 in the lateral wall at the front end thereof. After the air passes into the heater body 5 the heating function of the exhaust will, of course, continue and the heated air, following its natural tendency, will rise and follow the upwardly inclined top 7 and be discharged through the upper warm air passageway through the connector pipe 9 into the interior of the automobile body for the purpose of warming the same.

In the foregoing description I have disclosed a particularly simple and effective means for utilizing the heat of the exhaust manifold of an automobile engine for causing the relatively cold air from within the automobile body to be directed into close contact with the said manifold to be heated thereby and for discharging the same again into the automobile body for the purpose of warming the same to a comfortable temperature in cold weather. From this description, it is thought the novel details of construction, manner of operation and the advantages of my invention will be readily apparent to those skilled in the art to which it appertains.

What I claim is:—

1. An automobile heater of the class described comprising a hollow heater body shaped along its bottom to surround a portion of the exhaust manifold of the engine of the automobile upon which it is used and having its rear end adapted to lie adjacent the dash of the automobile and having a throatway adapted to register with a like sized opening in the dash, means for dividing said heater body to provide a low positioned cold air duct and an upwardly extending warm air duct, a connector pipe insertable through the dash opening into the rear end throatway, said connector pipe being divided horizontally to provide upper and lower portions and adapted to have its lower portion form an air inlet communicating with the cold air duct and its upper portion form an air outlet communicating with the warm air duct.

2. An automobile heater of the class described comprising a hollow heater body shaped along its bottom to surround a portion of the exhaust manifold of the engine of the automobile upon which it is used and having its rear end adapted to lie adjacent the dash of the automobile and having a throatway adapted to register with a like sized opening in the dash, means for dividing said heater body to provide a low positioned cold air duct and an upwardly extending warm air duct, a connector pipe insertable through the dash opening into the rear end throatway, said connector pipe being divided horizontally to provide upper and lower portions and adapted to have its lower portion form an air inlet communicating with the cold air duct and its upper portion form an air outlet communicating with the warm air duct, and a single control device carried by the connector pipe and extending over both inlet and outlet for controlling the passage of air therethrough.

3. An automobile heater of the class described comprising a hollow body shaped along its bottom to surround a portion of the exhaust manifold of the engine of the automobile upon which it is used and having its rear end adapted to lie adjacent the dash of the automobile and having a throatway adapted to register with a like sized opening in the dash, the said body being rectangular in cross section and having an inclined top providing a shallow rear end lying close to the manifold and for a relatively high positioning of the throatway in said rear end, a relatively narrow cold air duct secured to the heater body and communicating laterally with the interior thereof at its front end and extending along the bottom lateral edge portion of the body to lie closely adjacent the manifold and extending up the front lateral edge thereof and communicating laterally with said body adjacent the lower portion of the throatway, and a connector pipe insertable through the dash opening into the rear end throatway and having a flange for engaging the dash, the said connector pipe being divided by a horizontal plate into an upper air outlet passage and a lower air inlet passage the front end of the latter being closed and the pipe provided with a lateral passage for communication between the air inlet passage and the cold air duct.

4. An automobile heater of the class described comprising a hollow body shaped along its bottom to surround a portion of the exhaust manifold of the engine of the automobile upon which it is used and having its rear end adapted to lie adjacent the dash of the automobile and having a throatway adapted to register with a like sized opening in the dash, the said body being rectangular in cross section and having an inclined top providing a shallow front end lying close to the manifold and for a relatively high positioning of the throatway in said rear end, a relatively narrow cold air duct secured to the heater body and communicating laterally with the interior thereof at its front end and extending along the bottom lateral edge portion of the body to lie closely adjacent the manifold and extending up the rear lateral edge thereof and communicating laterally with said body adjacent the lower portion of the throatway, a connector pipe insertable through the dash opening into the rear end throatway and having a flange for engaging the dash, the said connector pipe being divided by a horizontal plate into an upper air outlet passage and a lower air inlet passage the front end of the latter being closed and the pipe provided with a lateral passage for communication between the air inlet passage and the cold air duct, and a single control device carried by the connector pipe and extending over both inlet and outlet passages for controlling the passage of air therethrough.

CLARENCE W. WALIZER.